US008589396B2

(12) United States Patent
Achtermann et al.

(10) Patent No.: US 8,589,396 B2
(45) Date of Patent: Nov. 19, 2013

(54) CROSS-GUIDED DATA CLUSTERING BASED ON ALIGNMENT BETWEEN DATA DOMAINS

(75) Inventors: Jeffrey M. Achtermann, Austin, TX (US); Indrajit Bhattacharya, New Delhi (IN); Kevin W. English, Jr., Fairfield, CT (US); Shantanu R. Godbole, New Delhi (IN); Sachindra Joshi, New Delhi (IN); Ashwin Srinivasan, New Delhi (IN); Ashish Verma, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 854 days.

(21) Appl. No.: 12/652,987

(22) Filed: Jan. 6, 2010

(65) Prior Publication Data
US 2011/0166850 A1 Jul. 7, 2011

(51) Int. Cl.
*G06F 17/30* (2006.01)
*G06F 17/27* (2006.01)

(52) U.S. Cl.
USPC ............................................ 707/737; 704/9

(58) Field of Classification Search
USPC ..................... 704/9; 707/736–740
See application file for complete search history.

(56) References Cited

U.S. PATENT DOCUMENTS

| | | | |
|---|---|---|---|
| 6,523,026 B1 | 2/2003 | Gillis | |
| 8,229,929 B2 | 7/2012 | Achtermann et al. | |
| 2004/0030551 A1* | 2/2004 | Marcu et al. | 704/240 |
| 2007/0083357 A1* | 4/2007 | Moore et al. | 704/4 |
| 2008/0249764 A1 | 10/2008 | Huang et al. | |
| 2009/0083023 A1* | 3/2009 | Foster et al. | 704/3 |
| 2009/0119095 A1 | 5/2009 | Beggelman et al. | |
| 2010/0121793 A1* | 5/2010 | Fujimaki et al. | 706/12 |
| 2011/0167064 A1 | 7/2011 | Achtermann et al. | |
| 2012/0191712 A1 | 7/2012 | Achtermann et al. | |
| 2012/0191713 A1 | 7/2012 | Achtermann et al. | |
| 2012/0197892 A1 | 8/2012 | Achtermann et al. | |

OTHER PUBLICATIONS

Blitzer et al., "Domain Adaptation with Structural Correspondence Learning", In Proceedings of the 2006 Conference on Empirical Methods in Natural Language Processing, pp. 120-128. Association for Computational Linguistics, 2006.*
Office Action (Mail Date (Dec. 8, 2011) for Patent Application No. 12/683,095; filing date Jan. 6, 2010 Confirmation No. 2403.

(Continued)

*Primary Examiner* — Samuel G Neway
(74) *Attorney, Agent, or Firm* — Schmeiser, Olsen & Watts, LLP; John Pivnichny

(57) ABSTRACT

A system and associated method for cross-guided data clustering by aligning target clusters in a target domain to source clusters in a source domain. The cross-guided clustering process takes the target domain and the source domain as inputs. A common word attribute shared by both the target domain and the source domain is a pivot vocabulary, and all other words in both domains are a non-pivot vocabulary. The non-pivot vocabulary is projected onto the pivot vocabulary to improve measurement of similarity between data items. Source centroids representing clusters in the source domain are created and projected to the pivot vocabulary. Target centroids representing clusters in the target domain are initially created by conventional clustering method and then repetitively aligned to converge with the source centroids by use of a cross-domain similarity graph that measures a respective similarity of each target centroid to each source centroid.

20 Claims, 7 Drawing Sheets

(56) References Cited

OTHER PUBLICATIONS

Dai et al. Co-Clustering Based Classification for Out-of-Domain Documents. International Conference on Knowledge Discovery and Data Mining, Proceedings of the 13th ACM SIGKDD international conference on Knowledge discovery and data mining, pp. 210-219, 2007.
Pan et al. Transfer Learning Via Dimensionality Reduction. In Proceedings of the 23rd AAAI Conference on Artificial Intelligence (AAAI 08). Chicago, Illinois, USA. Jul. 2008. pp. 677-682.
Shi et al. Actively Transfer Domain Knowledge. Lecture Notes in Artificial Intelligence; vol. 5212, Proceedings of the European conference on Machine Learning and Knowledge Discovery in Databases—Part II 2008. Publisher: Springer-Verlag Berlin Heidelberg. 16 pages.
Torrey et al. Transfer Learning. Handbook of Research on Machine Learning Applications. Publisher: IGI Global. 2009. 22 pages.
Wang et al. Using Wikipedia for Co-Clustering Based Cross-Domain Text Classification. ICDM, Proceedings of the 2008 Eighth IEEE International Conference on Data Mining, 2008. Publisher: IEEE Computer Society. pp. 1085-1090.
Zhang et al. Iterative Reinforcement Cross-Domain Text Classification. Advanced Data Mining and Applications (ADMA) 2008, LNAI 5139. Publisher: Springer-Verlag Berlin Heidelberg. pp. 282-292.
Basu et al. "Semi-supervised clustering by seeding," in International Conference on Machine Learning, 2002.
Baxter, J. "A model of inductive bias learning," Journal of Artificial Intelligence Research, vol. 12, pp. 149-198, 2000.
Berkhin, P. "Survey of clustering data mining techniques," Technical Report, Accrue Software, 2002.
Bhattacharya, I. et al. "Collective entity resolution in relational data," ACM Transactions on Knowledge Discovery from Data, vol. 1, No. 1, pp. 1-36, Mar. 2007.
Bilenko, M. et al. "Adaptive duplicate detection using learnable string similarity measures," in ACM SIGKDD International Conference on Knowledge Discovery and Data Mining, 2003.
Blitzer, J. et al. "Biographies, bollywood, boom-boxes and blenders: Domain adaptation for sentiment classification," in Association for Computational Liguistics, 2007.
Davidov, D. et al. "Parameterized generation of labeled datasets for text categorization based on a hierarchical directory," in the Annual International ACM SIGIR Conference, 2004.
Dhillon, I. et al. "Information-theoretic co-clustering," in ACM SIGKDD International Conference on Knowledge Discovery and Data Mining, 2003, 10 pages.
Klein, D. et al. "From instance-level constraints to space-level constraints: Making the most of prior knowledge in data clustering," in International Conference on Machine Learning, 2002, 8 pages.
Lewis, D. D. et al. "Rcv1: A new benchmark collection for text categorization research," Journal of Machine Learning Research, pp. 361-397, 2004.
Raina, R. et al. "Selftaught-learning: transfer learning from unlabeled data," in International Conference on Machine Learning, 2007, 8 pages.
Slonim, N. et al. "Document clustering using word clusters via the information bottleneck method," in the Annual International ACM SIGIR Conference, 2000, 8 pages.
Wagstaff, K. et al. "Constrained k-means clustering with background knowledge," in International Conference on Machine Learning, 2001, pp. 577-584.
Wenyuan et al. "Self-taught clustering," in International Conference on Machine Learning, 2008, 8 pages.
Wenyuan et al. "Transferring naive bayes classifiers for text classification," in Conference of the American Association for Artificial Intelligence (AAAI), 2007, 6 pages.
Wu, P. et al. "Improving svm accuracy by training on auxiliary data sources," in International Conference on Machine Learning, 2004, 8 pages.
Kuhn, H. W. "The hungarian method for the assignment problem," Naval Research Logistics Quarterly, vol. 2, pp. 83-97, 1955.
Thrun et al. "Learning to learn," Kluwer Academic Publishers, 1998; ISBN 0-7923-8047-9. pp. 3-17.
Office Action (Mail Date Dec. 8, 2011) for U.S. Appl. No. 12/683,095, filed Jan. 6, 2010, First Named Inventor: Jeffrey M. Achtermann.
Office Action (Mail Date Jan. 2, 2013) for U.S. Appl. No. 13/434,105, filed Mar. 29, 2012, First Named Inventor: Jeffrey M. Achtermann.
Office Action (Mail Date Jan. 11, 2013) for U.S. Appl. No. 13/437,287, filed Apr. 2, 2012, First Named Inventor: Jeffrey M. Achtermann.
Notice of Allowance (Mail Date Jun. 18, 2013) for U.S. Appl. No. 13/432,425, filed Mar. 28, 2012, First Named Inventor: Jeffrey M. Achtermann.
Office Action (Mail Date Dec. 7, 2012) for U.S. Appl. No. 13/432,425, filed Mar. 28, 2012, First Named Inventor: Jeffrey M. Achtermann.
Office Action Response filed Apr. 5, 2013 (Office action Mail Date Jan. 11, 2013) for U.S. Appl. No. 13/437,287, filed Apr. 2, 2012.
Office Action (Mail Date Feb. 5, 2013) U.S. Appl. No. 12/652,987, filed Jan. 6, 2010.
Dai et al.; Transferring naive byes classifiers for text classification; Conference of the American Association for Artificial Intelligence (AAAI); 2007; 6 pages.
Dai et al.; Co-clustering Based Classification for Out-of-Domain Documents; International Conference on Knowledge Discovery and Data Mining, Proceedings of the 13th ACM SIGKDD International Conference on Knowledge Discovery and Data Mining; 2007; pp. 210-219.
Pan et al.; Transfer Learning Via Dimensionality Reduction; In the Proceedings of the 23rd AAAI Conference on Artificial Intelligence (AAAI 08); Chicago, Illinois, USA; Jul. 2008; pp. 677-682.
Shi et al.; Actively Transfer Domain Knowledge; Lecture Notices in Artificial Intelligence; vol. 5212; Proceedings of the European Conference on Machine Learning and Knowledge Discovery in Databases—Part II; 2008; 16 pages.
Torrey et al.; Transfer Learning; Handbook of Research on Machine Learning Applications; Publisher: IGI Global; 2009; 22 pages.
Wang et al.; Using Wikipedia for Co-Clustering Based Cross-Domain Text Classification; ICDM, Proceedings of the 2008 Eighth IEEE International Conference on Data Mining; 2008; pp. 1085-1090.
Zhang et al.; Iterative Reinforcement Cross-Domain Text Classification; Advanced Data Mining Applications (ADMA); 2008; pp. 282-292.
Basu et al.; Semi-supervised clustering by seeding; International Conference on Machine Learning; 2002.
Baxter, J.; A model of inductive bias learning; Journal of Artificial Intelligence Research; vol. 12; 2000; pp. 149-198.
Berkhin, P.; Survey of clustering data mining techniques; Technical Report; Accrue Software; 2002.
Bhattacharya, I., et al.; Collective entity resolution in relational data; ACM Transactions onKnowledge Discovery for Data; vol. 1, No. 1; Mar. 2007; pp. 1-36.
Bilenko, M. et al.; Adaptive duplicate detection using learnable string similarity measures; ACM SIGKDD International Conference on Knowledge Discovery and Data Mining; 2003.
Blitzer, J. et al.; Biographies, Bollywood, boom-boxes and blenders: Domain adaptation for sentiment classification; Association for Computational Linguistics; 2007.
Davidov, D. et al.; Parameterized generation of labeled datasets for text categorization based on a hierarchical directory; The Annual International ACM SIGIR Conference; 2004.
Amendment filed Mar. 7, 2012 in response to Office Action (Mail Date Dec. 8, 2011) for U.S. Appl. No. 12/683,095, filed Jan. 6, 2010.
Notice of Allowance (Mail Date Mar. 19, 2012) for U.S. Appl. No. 12/683,095, filed Jan. 6, 2010.

\* cited by examiner

CROSS-GUIDED DATA CLUSTERING BASED ON ALIGNMENT BETWEEN DATA DOMAINS

CROSS-REFERENCE TO RELATED APPLICATION

This invention is related to U.S. patent application Ser. No. 12/683,095 entitled "CROSS-DOMAIN CLUSTERABILITY EVALUATION FOR CROSS-GUIDED DATA CLUSTERING BASED ON ALIGNMENT BETWEEN DATA DOMAINS", filed on Jan. 6, 2010.

BACKGROUND OF THE INVENTION

The present invention discloses a system and associated method for data clustering of a target domain that is guided by relevant data clustering of a source domain. Conventional k-means data clustering generates clusters based only on intrinsic nature of data in the target domain. Due to lack of guidance in clustering data in the target domain, conventional k-means data clustering often results in clusters that are not useful to human users in devising text analytics solutions.

BRIEF SUMMARY

According to one embodiment of the present invention, a method for optimizing data archive management scheduling comprises a processor of a computer system receiving the source domain and the target domain, wherein the source domain comprises at least one source data item and the target domain comprises at least one target data item; generating source centroids that respectively represent each source cluster of the source domain, wherein each source centroid of said source centroids is projected to at least one common attribute that is shared by said at least one source data item and said at least one target data item; initializing target centroids within the target domain, wherein said target centroids respectively represent each target cluster of the target domain; aligning the target centroids to the source centroids; and transmitting the aligned target centroids to an output device of the computer system.

According to one embodiment of the present invention, a computer program product comprises a computer readable memory unit that embodies a computer readable program code. The computer readable program code contains instructions that, when run by a processor of a computer system, implement a method for cross-guided clustering based on alignment between data domains.

According to one embodiment of the present invention, a computer system comprises a processor and a computer readable memory unit coupled to the processor, wherein the computer readable memory unit containing instructions that, when run by the processor, implement a method for cross-guided clustering based on alignment between data domains.

According to one embodiment of the present invention, a process for supporting computer infrastructure, said process comprising providing at least one support service for at least one of creating, integrating, hosting, maintaining, and deploying computer-readable code in a computing system, wherein the code in combination with the computing system is capable of performing a method for cross-guided clustering based on alignment between data domains.

DETAILED DESCRIPTION

Figure 1:
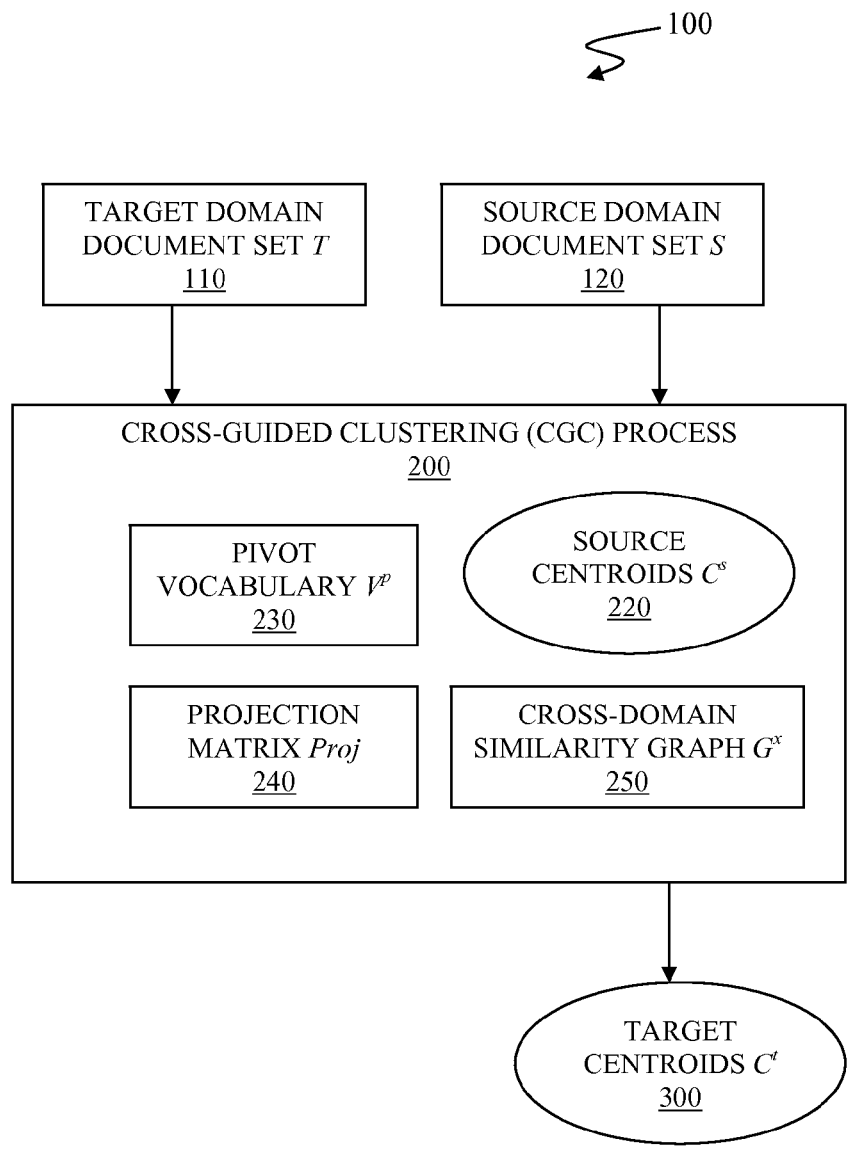
FIG. 1 illustrates a system 100 for cross-guided clustering based on alignment between data domains, in accordance with embodiments of the present invention.

FIG. 1 illustrates a system 100 for cross-guided clustering based on alignment between data domains, in accordance with embodiments of the present invention.

The system 100 comprises a target domain document set T 110, a source domain document set S 120, and a cross-guided clustering (CGC) process 200.

The target domain data item set or simply the target domain T 110 comprises a first set of data items $\{t_1, t_2, \ldots, t_n\}$, which is referred to as target data items. A target vocabulary $V^t$ refers to a first group of words that are the attributes of the target data items $\{t_1, t_2, \ldots, t_n\}$, of the target domain T 110. The target domain T 110 is a first input to the cross-guided clustering (CGC) process 200. In one embodiment of the present invention, the target data items are documents, of which attributes are words. In this specification, the terms "data item" and "document" are used interchangeably. Similarly, the terms "attribute" and "word" are used interchangeably throughout this specification.

The source domain data item set or simply the source domain S 120 comprises a second set of data items $\{s_1, s_2, \ldots, s_m\}$, which is referred to as source data items. A source vocabulary $V^s$ refers to a second group of words that are the attributes of the source data items $\{s_1, s_2, \ldots, s_m\}$ of the source domain S 120. The source domain S 120 is a second input to the CGC process 200.

The cross-guided clustering (CGC) process 200 receives the source domain S 120 and the target domain T 110 as inputs and generates k number of target centroids $C^t$ 300 as an output. While cross-guided clustering to generate the target centroids $C^t$ 300, the CGC process 200 generates intermediary data structures comprising source centroids $C^s$ 220, a pivot vocabulary 230, a projection matrix 240, and a cross-domain similarity graph $G^x$ 250. The CGC process 200 automatically transfers a relevant supervision over the source domain S 120 to clustering of the target domain T 110. The relevant supervised partitioning of the source domain S 120 is represented by the source centroids $C^s$ 220. As a result, the CGC process generates k number of target centroids $C^t$ 300 that is more meaningful for human users because the target centroids $C^t$ 300 are aligned with the source centroids $C^s$ 220 as much as possible rather than being clustered based solely on intrinsic clustering goodness on the target domain T 110 as in conventional data clustering. The CGC process 200 significantly improves clustering accuracy of conventional k-means algorithm by aligning the target centroids $C^t$ 300 with source centroids $C^s$ 220, which creates and utilizes the pivot vocabulary 230, the projection matrix 240, and the cross-domain similarity graph $G^x$ 250. Because the target centroids $C^t$ 300 are aligned with the source centroids $C^s$ 220, the CGC process 200 automates text analytics in predictive modeling and data classification and reduces cost and time for human involvement that are required in conventional k-means data clustering.

The source centroids $C^s$ 220 comprise a respective source centroid $\{\overline{C}_j^s\}$ that represents each source cluster of k' source clusters $\{C_1^s, C_2^s, \ldots C_{k'}^s\}$ that partitions the source domain S 120. In this specification, the term "cluster" means a disjoint subset of a domain, which is used interchangeably with the term "partition." The respective source centroid $\overline{C}_j^s$ is an item from the source domain that represents all source data items of the respective source cluster $C_j^s$. In this specification, the term "centroid" means a center element of a cluster that determines membership of an object element to the cluster according to a distance between the centroid and the object element. Each source data item of the source domain S 120 is assigned to a source centroid that is the nearest to the respective source data item of all the source centroids $C^s$ 220. Source data items are also referred to as being assigned to a source cluster that corresponds to the source centroid. See descriptions of step 320 in FIG. 3A, infra, for details of creating the source centroids $C^s$ 220.

The pivot vocabulary 230 addresses issues caused by words in the target domain T 110 and the source domain S 120 when the words are lexically identical but not semantically identical. The pivot vocabulary 230, denoted as $V^p$, comprises pivot words from the source vocabulary $V^s$ and the target vocabulary $V^t$ that are lexically identical. Words in the source vocabulary $V^s$ and the target vocabulary $V^t$ except the pivot vocabulary $V^p$ 230 are referred to as non-pivot words. See descriptions of step 310 of FIG. 3A, infra, for details of establishing the pivot vocabulary 230.

The projection matrix 240 addresses issues caused by words that are not shared in the source vocabulary $V^s$ and the target vocabulary $V^t$ but are semantically related. As in the cases of synonyms "agent" and "representative," the words do not count as similar in conventional clustering. The CGC process 200 employs a projection approach that distributes weights of non-pivot words over the weights of relevant pivot words in the pivot vocabulary $V^p$ 230. The CGC process 200 constructs the projection matrix 240, denoted as Proj(v, v'), for the source domain S 120 and the target domain T 110 from a context matrix Cxt such that columns of the projection matrix 240 correspond to pivot words from the pivot vocabulary $V^p$ 230 and rows of the projection matrix 240 correspond to non-pivot words. See descriptions of step 315 of FIG. 3A, infra, for details of creating the projection matrix 240.

The cross-domain similarity graph $G^x$ 250 is a bipartite graph comprising a first set of vertices corresponding to the source centroids $C^s$ 220 and a second set of vertices corresponding to the target centroids $C^t$ 300. The CGC process 200 adds an edge between each pair of vertices (i, j) from the first set of vertices and the second set of vertices and assigns a weight of the edge with $1 - d^x(\overline{C}_i^t, \overline{C}_j^s)$ such that the best alignment of the target centroids $C^t$ 300 to the source centroids $C^s$ 220 can be found by finding the maximum weighted bipartite match in the cross-domain similarity graph $G^x$ 250. See descriptions of step 360 of FIG. 3C, infra, for details of the cross-domain similarity graph $G^x$ 250.

The target centroids $C^t$ 300 comprise a respective target centroid $\{\overline{C}_i^t\}$ that represents each target cluster of k target clusters $\{C_1^t, C_2^t, \ldots, C_k^t\}$ that partitions the target domain T 110. The respective target centroid $\overline{C}_i^t$ is an item from the target domain that represents all target data items of the respective target cluster $C_i^t$. A target data item of the target domain T 110 may be assigned to a target centroid that is the nearest to the target data item of all the target centroids $C^t$ 300, and the target centroid and target data items assigned to the target centroid are collectively referred to as a target cluster. See descriptions of FIGS. 3B and 3C, infra, for details of the target centroids $C^t$ 300.

Figure 2A:
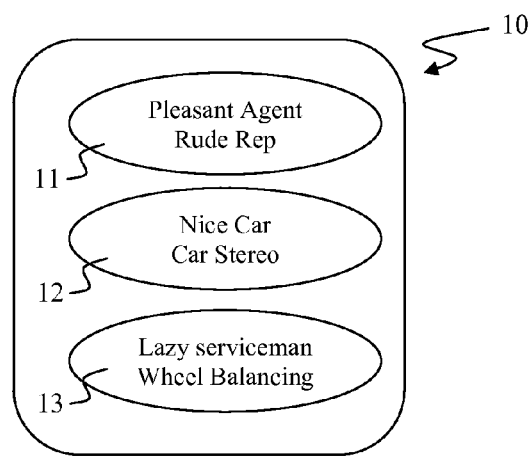
FIGS. 2A, 2B, and 2C illustrate examples of target clustering.
Figure 2B:
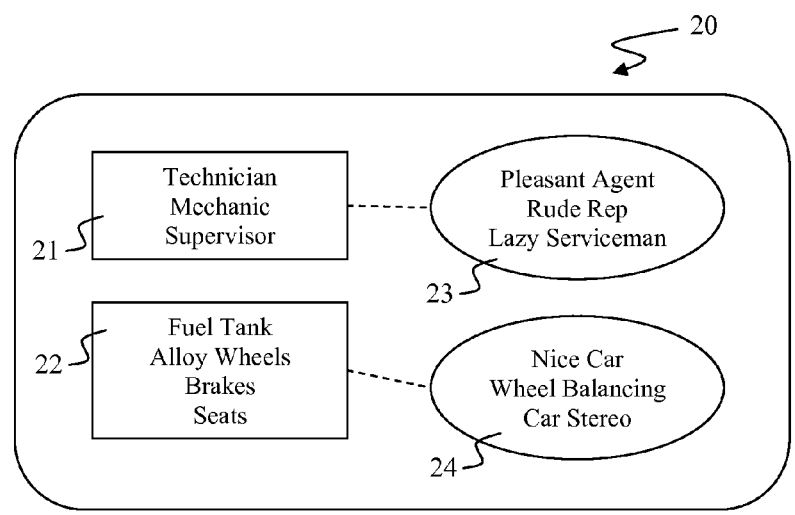
Figure 2C:
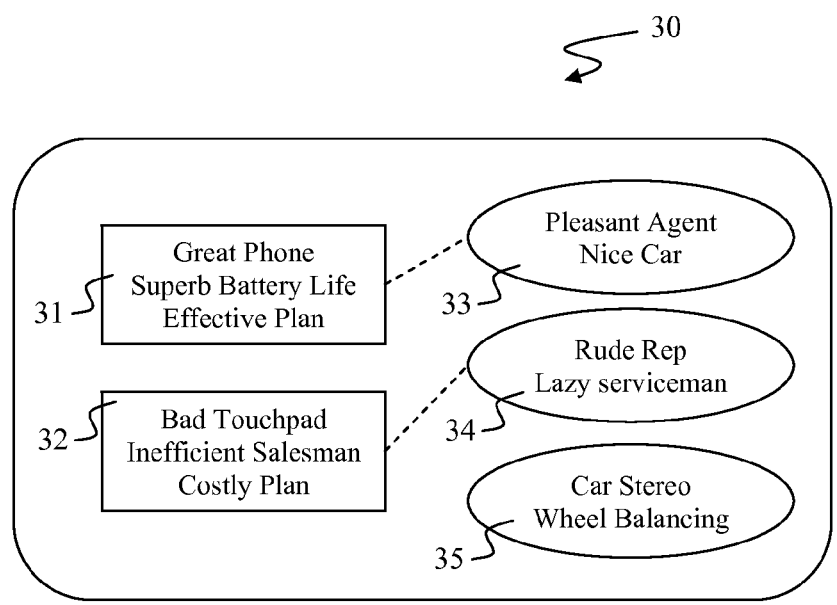

FIGS. 2A, 2B, and 2C illustrate examples of target clustering. The target domain is customer survey comments that are acquired through service desks of an automobile company. Analysts for the automobile company analyze the customer survey comments in various ways by clustering the target data into categorized accounts.

FIG. 2A illustrates a first clustering 10 of the target domain based only on the target data similarities. The first clustering 10 generates three clusters of an agents cluster 11, a parts and accessories cluster 12, and a servicing cluster 13. The first clustering 10 is not guided by supervised partitioning and consequently the three clusters 11, 12 and 13 may not be useful to the analysts.

FIG. 2B illustrates a second clustering 20 of the target domain wherein the analysts intend to create a personnel cluster 23 and a car-related issue cluster 24. Two pre-existing supervised partitions of a sales personnel partition 21 and a motor-cycle related issue partition 22 are utilized as a source domain to guide clustering of the target domain. To align target clusters 23 and 24 with the source partitions 21 and 22, respectively, the second clustering 20 deviates from the first clustering 10 of FIG. 2A, supra. The more the source partitions employed for supervising target clustering are relevant to the target clusters, the greater the extent of deviation of the guided target clustering from the target data based clustering. For example, when the analysts provide a source domain of two partitions of a computer parts partition and an IT technician partition to guide the second clustering 20, the car-related issue cluster 24 would not be clearly formulated. For another example, when the analysts intend to formulate a target cluster of customer sentiments, a source partition created around customer sentiments is necessary to guide the target clustering.

FIG. 2C illustrates a third clustering 30 of the target domain based on source partitions of customer survey comments for telecommunication industry. Because automobile company and telecommunication industry are not relevant in the nature of the business and part names, the third clustering 30 is aligned around customer sentiments with the source partitions. A first source partition 31 and a first target cluster 33 are on positive customer sentiments. A second source partition 32 and a second target cluster 34 are on negative customer sentiments.

FIG. 2C demonstrates that a number of target clusters and a number of source partitions are not necessarily identical. The source partitions that are not relevant to the target domain do not affect target clustering. When there is no relevant source partition, the target domain is clustered based only on intrinsic similarities among target data, as shown by a third target cluster 35.

In formulae of this specification, superscripts s, t and x indicate elements of the source domain, the target domain and the cross domain, respectively.

Figure 3A:
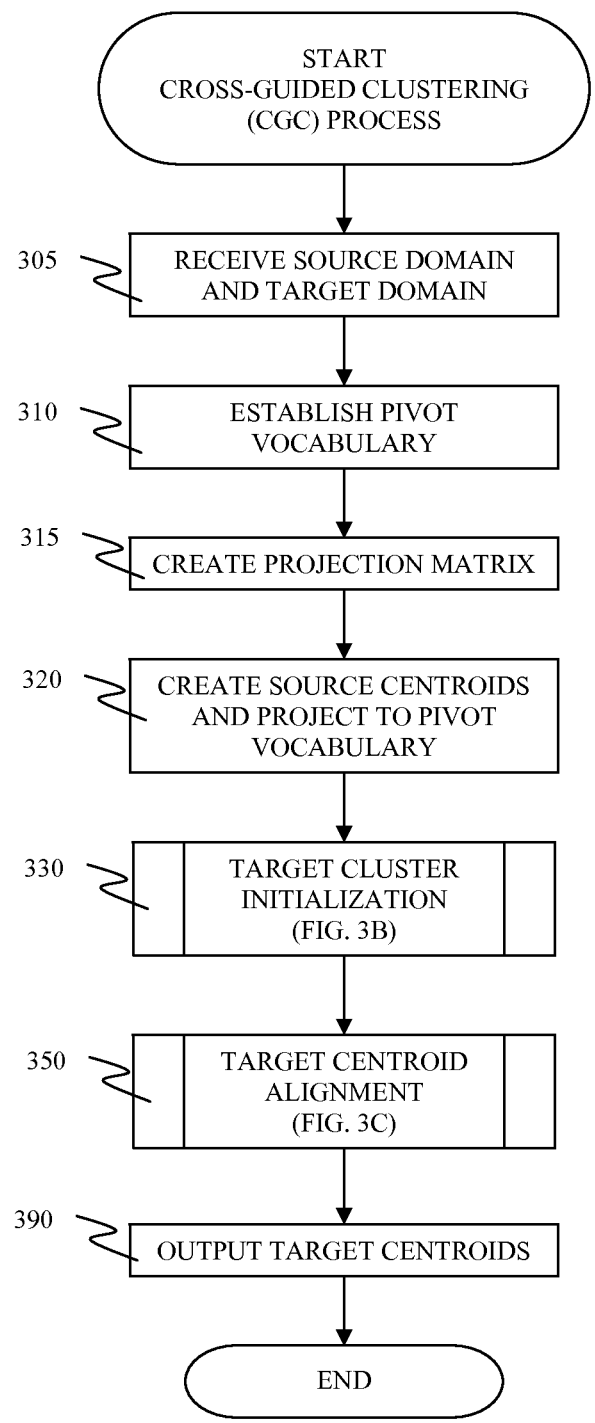
FIG. 3A is a flowchart depicting a method for cross-guided clustering based on alignment between data domains, in accordance with the embodiments of the present invention.

FIG. 3A is a flowchart depicting a method for cross-guided clustering based on alignment between data domains, in accordance with the embodiments of the present invention.

In step 305, a cross-guided clustering (CGC) process receives a source domain and a target domain as inputs to automatically align target clusters with source partitions to guide the target clustering. The source domain comprises at least one source data item. The target domain comprises at least one target data item. Data items of the target domain and the source domain are text of any length. Examples of the data items may be, inter alia, a word, a phrase, a sentence, a document, etc.

Figure 3B:
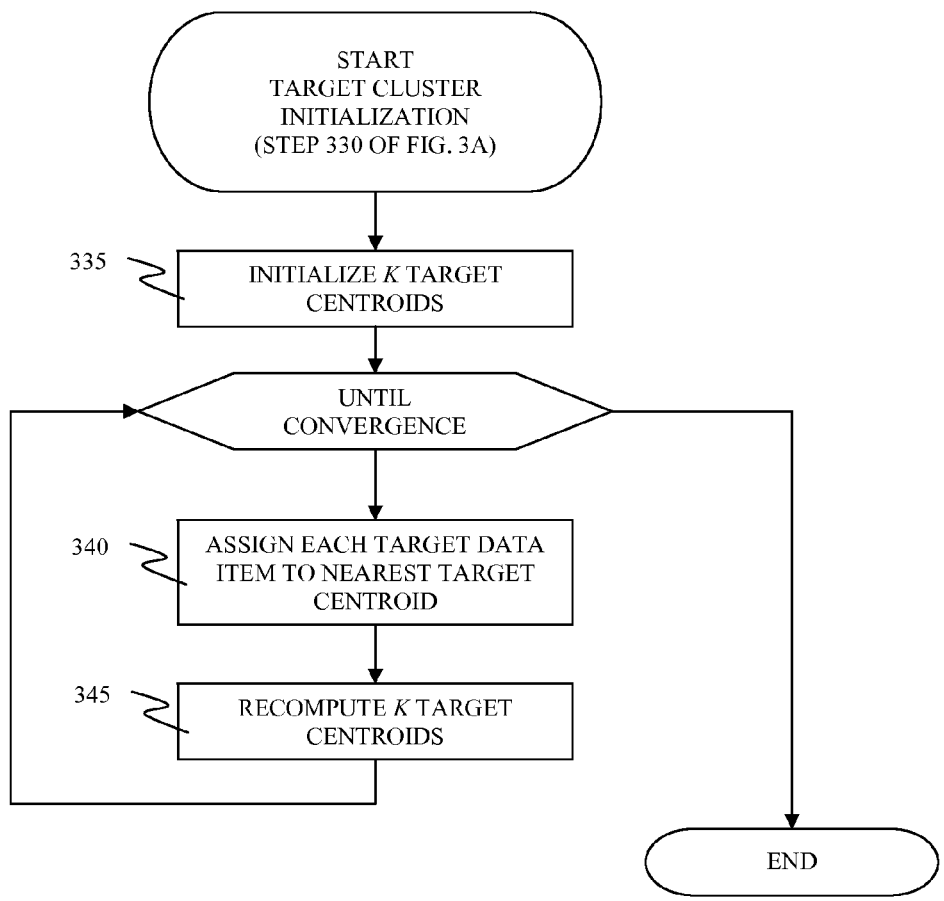
FIG. 3B is a flowchart depicting a method for initializing target clusters, step 330 of FIG. 3A, supra, in accordance with the embodiments of the present invention.
Figure 3C:
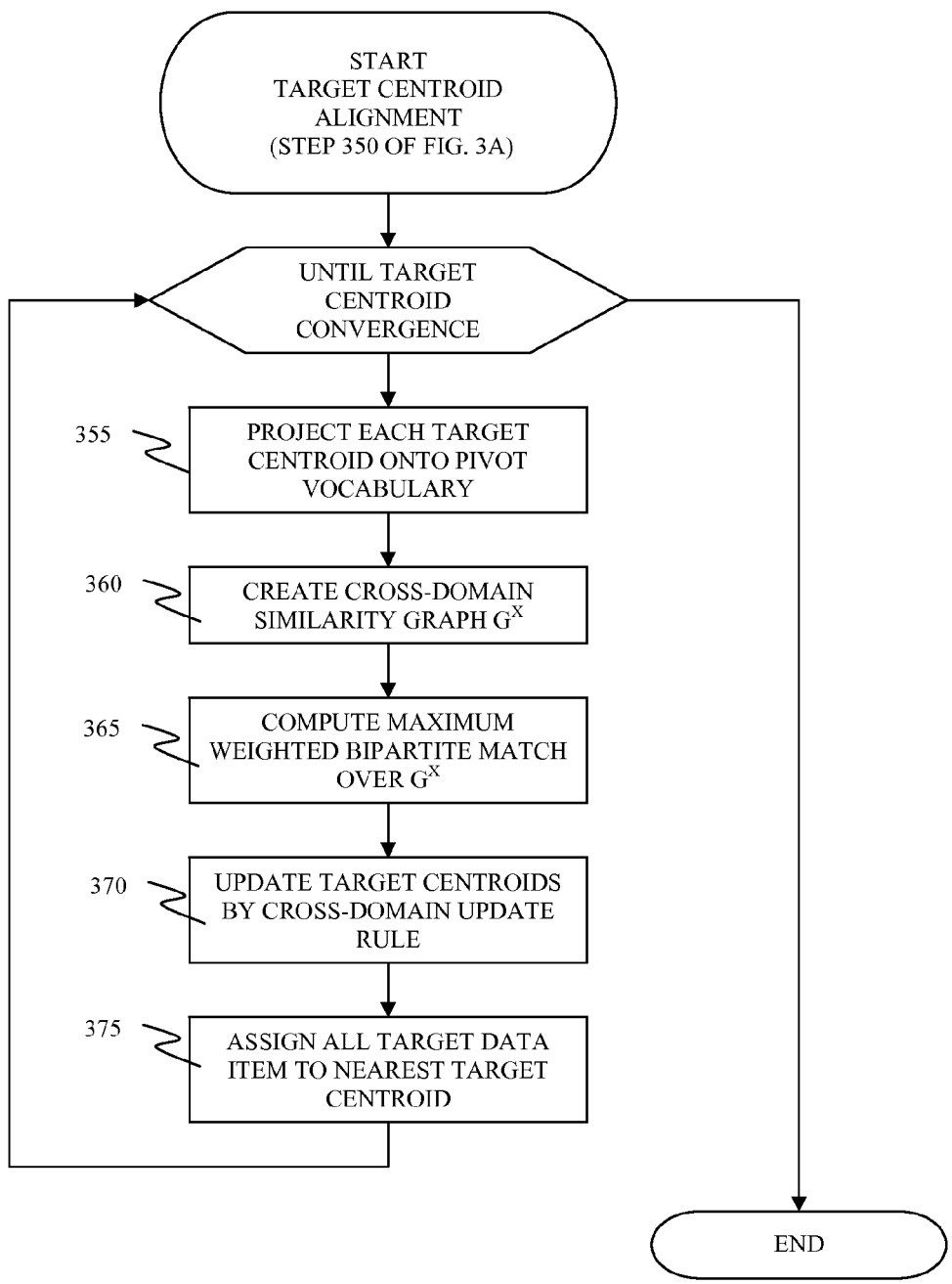
FIG. 3C is a flowchart depicting a method for aligning target centroids to the source centroids, step 350 of FIG. 3A, supra, in accordance with the embodiments of the present invention.

Because the target data items and the source data items are from different domains having different vocabularies, the CGC process resolve the discrepancies between vocabularies of the target domain and the source domain by creating pivot vocabulary in step 310, projecting source centroids to the pivot vocabulary in step 320, and projecting target centroids to the pivot vocabulary in step 355 of FIG. 3C, infra. After performing step 305, the CGC process proceeds with step 310.

In step 310, the CGC process establishes the pivot vocabulary between the source domain and the target domain. The pivot vocabulary $V^p$ comprises at least one pivot words from the source vocabulary $V^s$ and the target vocabulary $V^t$ that are lexically identical. The pivot vocabulary may not have the same meaning in the target domain and the source domain. In this specification, the term "vocabulary" means attributes over which data items and centroids are defined. A distance measure between two data items is based on an assumption that the two data items being compared utilize same vocabulary. Consequently, when comparing a target data item and a source data item from different domains, a cross-domain distance measure $d^x(t_i, s_j)$ is employed to compare clusters across domains. In one embodiment of the CGC process, the respective cross-domain distance measure $d^x(t_i, s_j)$ is predefined. In another embodiment, the respective cross-domain distance measure $d^x(t_i, s_j)$ is calculated as illustrated in descriptions of step 360 in FIG. 3C, infra. A target distance measure $d^t(\ )$ is used to assign target data items to target centroids and measure target divergence. The cross domain distance measure $d^x(\ )$ is used to align the target centroids with the source centroids and measure cross domain divergence. In this embodiment, the CGC process aligns each target cluster to at most one source partition, and vice versa.

The CGC process constructs a respective pivot weight pw(v) for each pivot word v in the pivot vocabulary $V^p$. The respective pivot weight pw(v) represents semantic similarity of the pivot word in the source domain and the target domain. The CGC process computes pivot weights based on an assumption that a pivot word is semantically similar across domains where the pivot word is used in similar contexts. Thus the CGC process constructs a respective word-word context matrix $Cxt^t$ and $Cxt^s$ for both the target domain and the source domain. An entry Cxt(v, v') of the context matrix denotes a number of times words v and v' occur within m tokens of each other over all documents in one domain. The CGC process employs a standard term frequency—inverse document frequency (TF-IDF) weighting to assign a weight to each entry Cxt(v, v') of the context matrix. A context vector Cxt(v) for a word v is the row corresponding to v in the context matrix Cxt, and captures the aggregated context of the word v in the respective domain. The pivot weight pw(v) is calculated as the cosine similarity of a first context vector $Cxt^s(v)$ for the source domain and a second context vector $Cxt^t(v)$ for the target domain:

$$pw(v)=\beta+(1-\beta)\cos(Cxt^s(v),Cxt^t(v)),$$

where β provides smoothing over sparsity and noise in the data.

All words in the source domain and the target domain other than the pivot words are non-pivot words. See descriptions of step 360 in FIG. 3C, infra, for details of utility of the pivot vocabulary. After performing step 310, the CGC process proceeds with step 315.

In step 315, the CGC process creates a respective projection matrix Proj(v, v') for each domain from a context matrix Cxt such that columns of the projection matrix Proj(v, v') correspond to pivot words from the pivot vocabulary $V^p$ and rows of the projection matrix Proj(v, v') correspond to non-pivot words. For each non-pivot word v, Proj(v, $v^p$) defines how the weight of non-pivot word v is distributed over pivot word $v^p$. The CGC process constructs a source projection matrix $Proj^s(v, v')$ for the source domain and a target projection matrix $Proj^t(v, v')$ for the target domain. By projecting the non-pivot synonyms to the pivot vocabulary $V^p$, the CGC process takes non-pivot synonyms of the source vocabulary and the target vocabulary that are not lexically similar into similarity computation. The CGC process calculates the projection matrix to distribute weights of the non-pivot synonyms of the target domain and the source domain into a respectively relevant pivot words. After performing step 315, the CGC process proceeds with step 320.

In step 320, the CGC process creates source centroids and subsequently projects each source centroid to the pivot vocabulary. The projected weight $wt^p(v, \overline{C}_j^s)$ for pivot word v in source centroid $\overline{C}_j^s$ is the augmented weight after projecting weights of all relevant non pivot words in the source vocabulary on the pivot word v:

$$wt^p(v,\overline{C}_j^s)=wt(v,\overline{C}_j^s)+\Sigma_{v'\in V^s_{-V^p}}Proj^s(v',v).$$

After performing step 320, the CGC process proceeds with step 330.

In step 330, the CGC process initializes target clusters. See descriptions of FIG. 3B, infra, for details of step 330. Then the CGC process proceeds with step 350.

In step 350, the CGC process aligns target centroids to the source centroids. See descriptions of FIG. 3C, infra, for details of step 350. After performing step 350, the CGC process proceeds with step 380.

In step 380, the CGC process outputs the target centroids to users. After performing step 380, the CGC process terminates.

FIG. 3B is a flowchart depicting a method for initializing target clusters, step 330 of FIG. 3A, supra, in accordance with the embodiments of the present invention.

In step 335, the CGC process initializes k number of target centroids. After performing step 335, the CGC process proceeds with step 340.

In step 340, the CGC process assigns each target data item to a nearest target centroid. After performing step 340, the CGC process proceeds with step 345.

In step 345, the CGC process recalculates the k number of target centroids from assigned target data items.

In one embodiment of the present invention, after performing step 345, the CGC process determines whether the target centroids converge. If the CGC process determines that the target centroids do not converge yet, the CGC process loops back to step 340. If the CGC process determines that the target centroids converge, the CGC process proceeds with step 350 of FIG. 3A, supra.

In another embodiment of the present invention, the CGC process performs steps 340 and 345 for n number of times and proceeds with step 350 of FIG. 3A, supra.

FIG. 3C is a flowchart depicting a method for aligning target centroids to the source centroids, step 350 of FIG. 3A, supra, in accordance with the embodiments of the present invention.

The cross-domain divergence depends both on the current target centroids and the cross domain alignment. The CGC process minimizes the cross-domain divergence by updating assignment of target data items to current target centroids in step 375, by updating the cross-domain alignment based on the current target centroids in step 365, and by re-estimating the target centroids based on the current data item assignment and the current cross-domain alignment in step 370.

In step 355, the CGC process projects each target centroids onto pivot vocabulary, which is analogous to calculating projected weight for source centroids. The projected weight $wt^p(v, \overline{C}_i^t)$ for pivot word v in a target centroid $\overline{C}_i^t$ is the augmented weight after projecting weights of all relevant non pivot words in the target vocabulary on the pivot word v:

$$wt^p(v, \overline{C}_i^t) = wt(v, \overline{C}_i^t) + \sum_{v' \in V^t - V^p} Proj^t(v', v)$$

After performing step 355, the CGC process proceeds with step 360.

In step 360, the CGC process creates a cross-domain similarity graph $G^x$ over the source centroids and the target centroids using projected weights of pivot words in the source domain and the target domain. To find a cross-domain alignment, the CGC process constructs the cross-domain similarity graph $G^x$ that is a bipartite graph comprising a first set of vertices S corresponding to source centroids, and a second set of vertices T corresponding to target centroids. An edge of the cross-domain similarity graph $G^x$ between each pair of vertices (i, j) from S and T has a weight of:

$$1 - d^x(\overline{C}_i^t, \overline{C}_j^s)$$

In one embodiment of the present invention, to determine cross-domain similarity between the target data items and the source data items, the CGC process measures the cross-domain distance between a target centroid and a source centroid comprising a respective data set by $$d^x(C_i^t, C_j^s) = 1 - \cos(C_i^t, C_j^s)$$

where $\cos(v_1, v_2)$ represents the cosine similarity of two weight vectors $v_1$ and $v_2$:

$$\cos(v_1, v_2) = \Sigma_{a_i} wt(v_1, a_i) \times wt(v_2, a_i)$$

where $a_i$ represents at least one dimension of the two weight vectors $v_1$ and $v_2$. The CGC process compares a target centroid vector and a source centroid vector by comparing weights over pivot words that are lexically the same.

In one embodiment of the present invention, the CGC process employs a hard clustering setting in which each target data item $t_i$ is assigned to only one target cluster $C_j^t$. In the same embodiment, the CGC process also employs a k-means setting that partitions the target domain T by assigning a respective target data item into a respective target cluster $C_j^t$ that has a target centroid $\{\overline{C}_i^t\}$ nearest to the respective target data item $t_j$ among all target centroids. A distance between a target data item $t_j$ and a target centroid $\{\overline{C}_i^t\}$ is represented by $d^t(t_j, \overline{C}_i^t)$. A divergence of a target cluster $C_i^t$, which is denoted by $D^t(C_i^t)$, is defined as a sum of squared distances of all target data items to a respective target centroids in the target cluster $C_i^t$, $$D^t(C_i^t) = \sum_{t_j} (d^t(t_j, \overline{C}_i^t))^2 \delta^t(t_j, \overline{C}_i^t)$$

where $\delta^t(t_j, \overline{C}_i^t)$ is 1 if the target data item $t_j$ is assigned to the target cluster $C_j^t$ and 0 otherwise.

Conventional k-means clustering seeks k number of best target centroids for respective target clusters that partition the target domain T such that the total divergence $\Sigma_i D^t(C_i^t)$ over all the target clusters in the target domain T is minimal.

In contrast with the conventional k-means clustering, the cross-guided clustering of the present invention as performed by the CGC process aligns the target clusters with the source clusters to generate the target centroids $C^t$ in a more effective and guided manner.

Provided a cross-domain alignment between source partitions and target clusters, the CGC process calculates a cross-domain divergence as $$D^x(C^t, C^s) = \Sigma_{C_i^t} \Sigma_{C_j^s} (d^x(\overline{C}_i^t, \overline{C}_j^s))^2 \delta^x(C_i^t, C_j^s) |C_i^t| \qquad \text{EQ. [1]}$$

where, in one embodiment of the present invention, $\delta^x(C_i^t, C_j^s)$ is 1 if $C_i^t$ is aligned with $C_j^s$, and 0 otherwise. To make the cross domain divergence $D^x(C^t, C^s)$ comparable to the divergence of target cluster $D^t(C_i^t)$, the CGC process weighs a respective size of each target cluster, denoted as $|C_i^t|$, into the cross-domain divergence calculation.

Provided the target centroids $C^t$, an assignment of target data items to the target centroids $C^t$, and an alignment between source partitions and the target centroids $C^t$, the CGC process calculates the combined divergence that strikes a balance between the target divergence and the cross-domain divergence:

$$D(C^t, C^s) = \alpha D^t(C^t) + (1-\alpha) D^t(C^t, C^s) \qquad \text{[EQ. 2]}$$

where $\alpha$ indicates a relative importance of the target divergence and the cross-domain divergence over all clusters in the target domain and the source domain. When $\alpha=1$, the combined divergence $D(C^t, C^s) = D^t(C^t)$ corresponds to target-only clustering. When $\alpha=0$, the combined divergence $D(C^t, C^s)$ leads to target clusters that are as similar as possible to source partitions, but not tight internally. The parameter $\alpha$ represents how relevant all clusters of the source domain and the target domain and how the target centroid convergence and the cross-domain alignment are traded off in the cross-domain update rules of EQ. 3, infra. The CGC process generates the target centroids $C^t$ 300 such that the combined divergence $D(C^t, C^s)$ is minimal, $$\min \sum_i D(C^t, C^s)$$

provided source clusters $C^s$.

The similarity between a source centroid and a target centroid is computed using a modified version of cosine similarity that takes the pivot weights into account:

$$sim^x(\overline{C}_i^t, \overline{C}_j^s) = \Sigma_{v \in V^p} wt(v, \overline{C}_i^t) wt(v, \overline{C}_j^s) pw(v),$$

where $wt(v, \overline{C}_i^t)$ represents the weight of pivot word v in the i-th target centroid $\overline{C}_i^t$, $wt(v, \overline{C}_i^s)$ represents the weight of pivot word v in the j-th source centroid $\overline{C}_j^s$, and pw(v) is the pivot weight of the pivot word v from step 310 of FIG. 3A, supra. After performing step 360, the CGC process proceeds with step 365.

In step 365, the CGC process computes a maximum weighted bipartite match over the cross-domain similarity graph $G^x$ to find a best alignment between source centroids and target centroids. A match is a subset of the edges such that any vertex is spanned by at most one edge, and a weight of a match is the sum of the weights of the included edges.

In a first embodiment of step 365, the CGC finds a best match over the cross-domain similarity graph $G^x$ that is a complete bipartite graph. Consequently, the every target cluster is aligned to one source partition, even in cases of the target cluster is dissimilar to the source partition.

In a second embodiment of step 365, the CGC process disregards all edges in the match with weights below some threshold such that a target cluster is not matched to a dissimilar source partition.

In a third embodiment of step 365, the CGC process defines $\delta^x(\overline{C}_i^t, \overline{C}_j^s)$ for $D^x(\ )$ as a match weight, which is 1 if $C_i^t$ is aligned with $C_i^s$, and 0 otherwise. In this embodiment, the weaker the match with the source, the lower is the penalty for divergence from that source centroid.

After performing step 365, the CGC process proceeds with step 370.

In step 370, the CGC process updates the target centroids according to a cross-domain update rule to align the target centroids with the source centroids.

The cross-domain update rule is formulated based on assumptions that all target data items correspond to a target centroid and that the target centroid does not necessarily correspond to a source centroid. The cross-domain update rules are formulated to re-estimate respective target centroid by minimizing divergence of target clusters based on target data items and the source centroids $C^s$. The cross-domain update rules respective to each target centroid $\overline{C}_i^t$ of the target centroids $C^t$ are provided to the CGC process as a result of differentiating and resolving the divergence function of the target clusters $$\frac{d(D(C^t, C^s))}{d(\overline{C}_i^t)} = 0,$$

which is $$\overline{C}_i^t = \frac{\alpha \sum_{t_i \in C_i^t} t_i + (1-\alpha) \sum_j \delta^x(C_i^t, C_j^s) \overline{C}_j^s}{\alpha |C_i^t| + (1-\alpha)|C_i^t| \sum_j \delta^x(C_i^t, C_j^s)} \quad [\text{EQ. 3}]$$

The CGC process repeatedly updates each target centroid $\overline{C}_i^t$ according to respective cross-domain update rule.

A first term of the numerator, $\alpha \sum_{t_i \in C_i^t} t_i$, of the cross-domain update rules represents a target centroid convergence. The CGC process gradually updates each target centroid toward the 'center' of respective target cluster to which a respective target centroid and target data items assigned to the respective target centroid are members.

A second term of the numerator, $(1-\alpha)\Sigma_j \delta^x(C_i^t, C_j^s)\overline{C}_j^s$, of the cross-domain update rules represents the cross-domain alignment of target centroids to source centroids. The CGC process also aligns target centroids to corresponding source centroids, but the cross-domain alignment is affected by the extent of match with the source centroid. A target centroid moves along a corresponding source centroid across domains only when the target centroid has a significant match in the source domain. After performing step 370, the CGC process proceeds with step 375.

In step 375, the CFC process reassigns all target data items to a nearest target centroid respective to the target data item.

In one embodiment of the present invention, after performing step 375, the CGC process determines whether the target centroids converge to be aligned with source centroids. If the CGC process determines that the target centroids do not converge yet, the CGC process loops back to step 355. If the CGC process determines that the target centroids converge, the CGC process proceeds with step 380 of FIG. 3A, supra.

In another embodiment of the present invention, the CGC process performs steps 355 through 375 for m number of times and proceeds with step 380 of FIG. 3A, supra.

Figure 4:
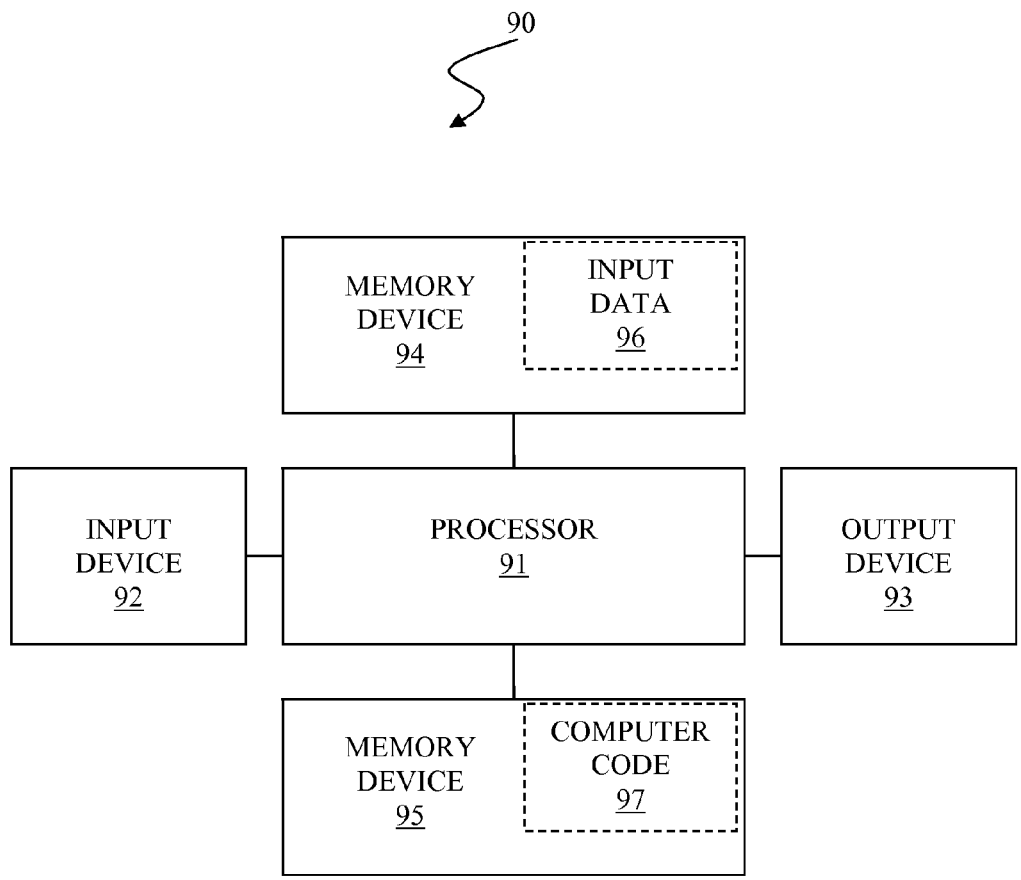
FIG. 4 illustrates a computer system used for cross-guided clustering based on alignment between data domains, in accordance with the embodiments of the present invention.

FIG. 4 illustrates a computer system 90 used for cross-guided clustering based on alignment between data domains, in accordance with the embodiments of the present invention.

The computer system 90 comprises a processor 91, an input device 92 coupled to the processor 91, an output device 93 coupled to the processor 91, and computer readable memory units comprising memory devices 94 and 95 each coupled to the processor 91. The input device 92 may be, inter alia, a keyboard, a mouse, a keypad, a touch screen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for cross-guided clustering based on alignment between data domains according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Any of the components of the present invention can be deployed, managed, serviced, etc. by a service provider that offers to deploy or integrate computing infrastructure with respect to a process for cross-guided clustering based on alignment between data domains of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for cross-guided clustering based on alignment between data domains.

In another embodiment, the invention provides a business method that performs the process steps of the invention on a subscription, advertising and/or fee basis. That is, a service provider, such as a Solution Integrator, can offer to create, maintain, support, etc. a process for cross-guided clustering based on alignment between data domains of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) 94, 95 may be utilized. The term computer usable medium or computer readable medium collectively refers to computer usable/readable storage medium 94, 95. The computer-usable or computer-readable medium 94, 95 may be, for example but not limited to, an electronic, magnetic, optical, electromagnetic, infrared, or semiconductor system, apparatus, a device, or any suitable combination of the foregoing. More specific examples (a non-exhaustive list) of the computer-readable medium 94, 95 would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-usable or computer-readable medium 94, 95 could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium 94, 95 may be any medium that can contain, or store a program for use by or in connection with a system, apparatus, or device that executes instructions.

Computer code 97 for carrying out operations of the present invention may be written in any combination of one or more programming languages, including an object oriented programming language such as Java, Smalltalk, C++ or the like and conventional procedural programming languages, such as the "C" programming language or similar programming languages. The computer code 97 may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. The term "computer program instructions" is interchangeable with the term "computer code 97" in this specification. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in the computer-readable medium 94, 95 that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, run substantially concurrently, or the blocks may sometimes run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for cross-guided data clustering by aligning target clusters in a target domain to source clusters in a source domain, said method comprising:
   a processor of a computer system receiving the source domain and the target domain, wherein the source domain comprises at least one source data item and the target domain comprises at least one target data item;
   generating source centroids that respectively represent each source cluster of the source domain, wherein each source centroid of said source centroids is projected to at least one common attribute that is shared by said at least one source data item and said at least one target data item;
   initializing target centroids within the target domain, wherein said target centroids respectively represent each target cluster of the target domain;
   aligning the target centroids to the source centroids; and
   transmitting the aligned target centroids to an output device of the computer system.

2. The method of claim 1, said generating the source centroids comprising:
   establishing a pivot vocabulary, wherein a common attribute of said at least one common attribute is word, the pivot vocabulary being defined as a first set of lexically identical words appearing in both the source domain and the target domain, wherein said at least one source data item and said at least one target data item is selected from a set of documents;
   creating a projection matrix of a non-pivot vocabulary to the pivot vocabulary such that the projection matrix represents weights associated with the non-pivot vocabulary in terms of weights associated with the pivot vocabulary, wherein the non-pivot vocabulary is a second set of words appearing in either the source domain or the target domain but not both domains;
   assigning said at least one source data item to a respective source centroid that has a smallest distance value to each source data item of said at least one source data item, wherein the respective source centroid represents said each source cluster; and
   calculating a respective weight of a pivot word appearing in the respective source centroid by projecting a weight of a non-pivot word that is relevant to the pivot word, for each pivot word in the pivot vocabulary, wherein the non-pivot word is in the non-pivot vocabulary.

3. The method of claim 2, said aligning comprising:
   projecting each target centroid to the pivot vocabulary;
   creating a cross-domain similarity graph comprising a first set of vertices S and a second set of vertices T, wherein each vertex of the first set S corresponds to each source centroid, wherein each vertex of the second set T corresponds to said each target centroid, and wherein a weight of a first edge between a first source centroid from the first set S and a first target centroid from the second set T represents a respective cross-domain similarity of the first target centroid to the first source centroid;
   computing a maximum-weighted bipartite match over the cross-domain similarity graph such that the maximum-weighted bipartite match represents an alignment that has a largest sum of all cross-domain similarities between the source centroids in the first set S and the target centroids in the second set T, wherein a match comprises at least one edge of the cross-domain similarity graph, and wherein a weight of the match is the sum of weights of all edges in the match;
   updating target centroids in the maximum-weighted bipartite match by a cross-domain update rule that is respectively associated with each target centroid in the maximum-weighted bipartite match such that a respective divergence between said each source centroid and updated target centroids is reduced; and
   reassigning said at least one target data item to a nearest target centroid among all target centroids from said updating.

4. The method of claim 3, wherein the cross-domain update rule that is respectively associated with said each target centroid for an updated target centroid $\overline{C}_i^t$ is $$\overline{C}_i^t = \frac{\alpha \sum_{t_i \in C_i^t} t_i + (1-\alpha) \sum_j \delta^x(C_i^t, C_j^s) \overline{C}_j^s}{\alpha |C_i^t| + (1-\alpha) |C_i^t| \sum_j \delta^x(C_i^t, C_j^s)},$$

wherein $t_i$ represents said at least one target data item, wherein $\alpha \Sigma_{t_i \in C_i^t} t_i$ quantifies a target centroid convergence for all target data item such that an updated target centroid $\overline{C}_i^t$ converges toward a center of a respective target cluster corresponds to said each target centroid, wherein $(1-\alpha)\Sigma_j \delta^x(C_i^t, C_j^s)\overline{C}_j^s$ quantifies the cross-domain alignment of the target centroids to the source centroids $\overline{C}_j^s$, and wherein a relevance parameter $\alpha$ represents how relevant the source clusters $C_j^s$ and the target clusters $C_i^t$ and how the target centroid convergence and the cross-domain alignment are traded off in said updating.

5. The method of claim 3, wherein the respective cross-domain similarity of the first target centroid to the first source centroid is $\text{sim}^x(\overline{C}_i^t, \overline{C}_j^s) = \Sigma_{v \in V^p} \text{wt}(v, \overline{C}_i^t) \text{wt}(v, \overline{C}_j^s) \text{pw}(v)$, wherein $V^p$ is the pivot vocabulary, wherein $\text{wt}(v, \overline{C}_i^t)$ represents a weight of pivot word v in the first target centroid $\overline{C}_i^t$, wherein $\text{wt}(v, \overline{C}_j^s)$ represents the weight of pivot word v in the first source centroid $\overline{C}_j^s$, and wherein $\text{pw}(v)$ is the pivot weight of the pivot word v.

6. A computer program product comprising:
   a computer readable hardware storage device having a computer readable program code embodied therein, said computer readable program code containing instructions that, upon being executed by a processor of a computer system, perform a method for cross-guided data clustering by aligning target clusters in a target domain to source clusters in a source domain, said method comprising:
   said processor receiving the source domain and the target domain, wherein the source domain comprises at least one source data item and the target domain comprises at least one target data item;
   said processor generating source centroids that respectively represent each source cluster of the source domain, wherein each source centroid of said source centroids is projected to at least one common attribute that is shared by said at least one source data item and said at least one target data item;
   said processor initializing target centroids within the target domain, wherein said target centroids respectively represent each target cluster of the target domain;
   said processor aligning the target centroids to the source centroids; and
   said processor transmitting the aligned target centroids to an output device of a computer system.

7. The computer program product of claim 6, said generating the source centroids comprising:
  establishing a pivot vocabulary, wherein a common attribute of said at least one common attribute is word, the pivot vocabulary being defined as a first set of lexically identical words appearing in both the source domain and the target domain, wherein said at least one source data item and said at least one target data item is selected from a set of documents;
  creating a projection matrix of a non-pivot vocabulary to the pivot vocabulary such that the projection matrix represents weights associated with the non-pivot vocabulary in terms of weights associated with the pivot vocabulary, wherein the non-pivot vocabulary is a second set of words appearing in either the source domain or the target domain but not both domains;
  assigning said at least one source data item to a respective source centroid that has a smallest distance value to each source data item of said at least one source data item, wherein the respective source centroid represents said each source cluster; and
  calculating a respective weight of a pivot word appearing in the respective source centroid by projecting a weight of a non-pivot word that is relevant to the pivot word, for each pivot word in the pivot vocabulary, wherein the non-pivot word is in the non-pivot vocabulary.

8. The computer program product of claim 7, said aligning comprising:
  projecting each target centroid to the pivot vocabulary;
  creating a cross-domain similarity graph comprising a first set of vertices S and a second set of vertices T, wherein each vertex of the first set S corresponds to each source centroid, wherein each vertex of the second set T corresponds to said each target centroid, and wherein a weight of a first edge between a first source centroid from the first set S and a first target centroid from the second set T represents a respective cross-domain similarity of the first target centroid to the first source centroid;
  computing a maximum-weighted bipartite match over the cross-domain similarity graph such that the maximum-weighted bipartite match represents an alignment that has a largest sum of all cross-domain similarities between the source centroids in the first set S and the target centroids in the second set T, wherein a match comprises at least one edge of the cross-domain similarity graph, and wherein a weight of the match is the sum of weights of all edges in the match;
  updating target centroids in the maximum-weighted bipartite match by a cross-domain update rule that is respectively associated with each target centroid in the maximum-weighted bipartite match such that a respective divergence between said each source centroid and updated target centroids is reduced; and
  reassigning said at least one target data item to a nearest target centroid among all target centroids from said updating.

9. The computer program product of claim 8, wherein the cross-domain update rule That is respectively associated with said each target centroid for an updated target centroid $\overline{C}_i^t$ is $$\overline{C}_i^t = \frac{\alpha \sum_{t_i \in C_i^t} t_i + (1-\alpha) \sum_j \delta^x(C_i^t, C_j^s) \overline{C}_j^s}{\alpha |C_i^t| + (1-\alpha)|C_i^t|\sum_j \delta^x(C_i^t, C_j^s)},$$

wherein $t_i$ represents said at least one target data item, wherein $\alpha \sum_{t_i \in C_i^t} t_i$ quantifies a target centroid convergence for all target data item such that an updated target centroid $\overline{C}_i^t$ converges toward a center of a respective target cluster corresponds to said each target centroid, wherein $(1-\alpha)\Sigma_j \delta^x(C_i^t, C_j^s)\overline{C}_j^s$ quantifies the cross-domain alignment of the target centroids to the source centroids $\overline{C}_j^s$, and wherein a relevance parameter $\alpha$ represents how relevant the source clusters $C_j^s$ and the target clusters $C_i^t$ and how the target centroid convergence and the cross-domain alignment are traded off in said updating.

10. The computer program product of claim 8, wherein the respective cross-domain similarity of the first target centroid to the first source centroid is $\text{sim}^x(\overline{C}_i^t, \overline{C}_j^s) = \Sigma_{v \in V^p} \text{wt}(v, \overline{C}_i^t)\text{wt}(v,\overline{C}_j^s)\text{pw}(v)$, wherein $V^p$ is the pivot vocabulary, wherein $\text{wt}(v, \overline{C}_i^t)$ represents a weight of pivot word v in the first target centroid $\overline{C}_i^t$, wherein $\text{wt}(v, \overline{C}_i^s)$ represents the weight of pivot word v in the first source centroid $\overline{C}_i^s$, and wherein $\text{pw}(v)$ is the pivot weight of the pivot word v.

11. A computer system comprising a processor and a computer readable memory unit coupled to the processor, said computer readable memory unit containing instructions that when run by the processor implement a method for cross-guided data clustering by aligning target clusters in a target domain to source clusters in a source domain, said method comprising:
  said processor receiving the source domain and the target domain, wherein the source domain comprises at least one source data item and the target domain comprises at least one target data item;
  said processor generating source centroids that respectively represent each source cluster of the source domain, wherein each source centroid of said source centroids is projected to at least one common attribute that is shared by said at least one source data item and said at least one target data item;
  said processor initializing target centroids within the target domain, wherein said target centroids respectively represent each target cluster of the target domain;
  said processor aligning the target centroids to the source centroids; and
  said processor transmitting the aligned target centroids to an output device of the computer system.

12. The computer system of claim 11, said generating the source centroids comprising:
  establishing a pivot vocabulary, wherein a common attribute of said at least one common attribute is word, the pivot vocabulary being defined as a first set of lexically identical words appearing in both the source domain and the target domain, wherein said at least one source data item and said at least one target data item is selected from a set of documents;
  creating a projection matrix of a non-pivot vocabulary to the pivot vocabulary such that the projection matrix represents weights associated with the non-pivot vocabulary in terms of weights associated with the pivot vocabulary, wherein the non-pivot vocabulary is a second set of words appearing in either the source domain or the target domain but not both domains;
  assigning said at least one source data item to a respective source centroid that has a smallest distance value to each source data item of said at least one source data item, wherein the respective source centroid represents said each source cluster; and
  calculating a respective weight of a pivot word appearing in the respective source centroid by projecting a weight of a non-pivot word that is relevant to the pivot word, for each pivot word in the pivot vocabulary, wherein the non-pivot word is in the non-pivot vocabulary.

13. The computer system of claim 12, said aligning comprising:

projecting each target centroid to the pivot vocabulary;

creating a cross-domain similarity graph comprising a first set of vertices S and a second set of vertices T, wherein each vertex of the first set S corresponds to each source centroid, wherein each vertex of the second set T corresponds to said each target centroid, and wherein a weight of a first edge between a first source centroid from the first set S and a first target centroid from the second set T represents a respective cross-domain similarity of the first target centroid to the first source centroid;

computing a maximum-weighted bipartite match over the cross-domain similarity graph such that the maximum-weighted bipartite match represents an alignment that has a largest sum of all cross-domain similarities between the source centroids in the first set S and the target centroids in the second set T, wherein a match comprises at least one edge of the cross-domain similarity graph, and wherein a weight of the match is the sum of weights of all edges in the match;

updating target centroids in the maximum-weighted bipartite match by a cross-domain update rule that is respectively associated with each target centroid in the maximum-weighted bipartite match such that a respective divergence between said each source centroid and updated target centroids is reduced; and reassigning said at least one target data item to a nearest target centroid among all target centroids from said updating.

14. The computer system of claim 13, wherein the cross-domain update rule that is respectively associated with said each target centroid for an updated target centroid $\overline{C}_i^t$ is $$\overline{C}_i^t = \frac{\alpha \sum_{t_i \in C_i^t} t_i + (1-\alpha) \sum_j \delta^x(C_i^t, C_j^s)\overline{C}_j^s}{\alpha |C_i^t| + (1-\alpha)|C_i^t|\sum_j \delta^x(C_i^t, C_j^s)},$$

wherein $t_i$ represents said at least one target data item, wherein $\alpha \sum_{t_i \in C_i^t} t_i$ quantifies a target centroid convergence for all target data item such that an updated target centroid $\overline{C}_i^t$ converges toward a center of a respective target cluster corresponds to said each target centroid, wherein $(1-\alpha)\sum_j \delta^x(C_i^t, C_j^s)\overline{C}_j^s$ quantifies the cross-domain alignment of the target centroids to the source centroids $\overline{C}_j^s$, and wherein a relevance parameter $\alpha$ represents how relevant the source clusters $C_j^s$ and the target clusters $C_i^t$ and how the target centroid convergence and the cross-domain alignment are traded off in said updating.

15. The computer system of claim 13, wherein the respective cross-domain similarity Of the first target centroid to the first source centroid is $\text{sim}^x(\overline{C}_i^t, \overline{C}_j^s) = \Sigma_{v \in V^p} \text{wt}(v, \overline{C}_i^t)\text{wt}(v, \overline{C}_j^s)\text{pw}(v)$, wherein $V^p$ is the pivot vocabulary, wherein $\text{wt}(v, \overline{C}_i^t)$ represents a weight of pivot word v in the first target centroid $\overline{C}_i^t$, wherein $\text{wt}(v, \overline{C}_j^s)$ represents the weight of pivot word v in the first source centroid $\overline{C}_j^s$, and wherein $\text{pw}(v)$ is the pivot weight of the pivot word v.

16. A process for supporting computer infrastructure, said process comprising providing at least one support service for at least one of creating, integrating, hosting, maintaining, and deploying computer-readable code in a computing system, wherein the code in combination with the computing system is capable of performing a method for cross-guided data clustering by aligning target clusters in a target domain to source clusters in a source domain, said method comprising:

receiving the source domain and the target domain, wherein the source domain comprises at least one source data item and the target domain comprises at least one target data item;

generating source centroids that respectively represent each source cluster of the source domain, wherein each source centroid of said source centroids is projected to at least one common attribute that is shared by said at least one source data item and said at least one target data item;

initializing target centroids within the target domain, wherein said target centroids respectively represent each target cluster of the target domain;

aligning the target centroids to the source centroids; and transmitting the aligned target centroids to an output device of the computer system.

17. The process of claim 16, said generating the source centroids comprising:

establishing a pivot vocabulary, wherein a common attribute of said at least one common attribute is word, the pivot vocabulary being defined as a first set of lexically identical words appearing in both the source domain and the target domain, wherein said at least one source data item and said at least one target data item is selected from a set of documents;

creating a projection matrix of a non-pivot vocabulary to the pivot vocabulary such that the projection matrix represents weights associated with the non-pivot vocabulary in terms of weights associated with the pivot vocabulary, wherein the non-pivot vocabulary is a second set of words appearing in either the source domain or the target domain but not both domains;

assigning said at least one source data item to a respective source centroid that has a smallest distance value to each source data item of said at least one source data item, wherein the respective source centroid represents said each source cluster; and calculating a respective weight of a pivot word appearing in the respective source centroid by projecting a weight of a non-pivot word that is relevant to the pivot word, for each pivot word in the pivot vocabulary, wherein the non-pivot word is in the non-pivot vocabulary.

18. The process of claim 17, said aligning comprising:

projecting each target centroid to the pivot vocabulary;

creating a cross-domain similarity graph comprising a first set of vertices S and a second set of vertices T, wherein each vertex of the first set S corresponds to each source centroid, wherein each vertex of the second set T corresponds to said each target centroid, and wherein a weight of a first edge between a first source centroid from the first set S and a first target centroid from the second set T represents a respective cross-domain similarity of the first target centroid to the first source centroid;

computing a maximum-weighted bipartite match over the cross-domain similarity graph such that the maximum-weighted bipartite match represents an alignment that has a largest sum of all cross-domain similarities between the source centroids in the first set S and the target centroids in the second set T, wherein a match comprises at least one edge of the cross-domain similarity graph, and wherein a weight of the match is the sum of weights of all edges in the match;

updating target centroids in the maximum-weighted bipartite match by a cross-domain update rule that is respectively associated with each target centroid in the maximum-weighted bipartite match such that a respective divergence between said each source centroid and updated target centroids is reduced; and reassigning said at least one target data item to a nearest target centroid among all target centroids from said updating.

19. The process of claim 18, wherein the cross-domain update rule that is respectively associated with said each target centroid for an updated target centroid $\overline{C}_i^t$ is $$\overline{C}_i^t = \frac{\alpha \sum_{t_i \in C_i^t} t_i + (1-\alpha) \sum_j \delta^x(C_i^t, C_j^s) \overline{C}_j^s}{\alpha |C_i^t| + (1-\alpha)|C_i^t| \sum_j \delta^x(C_i^t, C_j^s)},$$

wherein $t_i$ represents said at least one target data item, wherein $\alpha \sum_{t_i \in C_i^t} t_i$ quantifies a target centroid convergence for all target data item such that an updated target centroid $\overline{C}_i^t$ converges toward a center of a respective target cluster corresponds to said each target centroid, wherein $(1-\alpha)\Sigma_j \delta^x(C_i^t, C_j^s) \overline{C}_j^s$ quantifies the cross-domain alignment of the target centroids to the source centroids $\overline{C}_j^s$, and wherein a relevance parameter $\alpha$ represents how relevant the source clusters $C_j^s$ and the target clusters $C_i^t$ and how the target centroid convergence and the cross-domain alignment are traded off in said updating.

20. The process of claim 18, wherein the respective cross-domain similarity of the first target centroid to the first source centroid is $\text{sim}^x(\overline{C}_i^t, \overline{C}_j^s) = \Sigma_{v \in V^p} \text{wt}(v, \overline{C}_i^t) \text{wt}(v, \overline{C}_j^s) \text{pw}(v)$, wherein $V^p$ is the pivot vocabulary, wherein $\text{wt}(v, \overline{C}_i^t)$ represents a weight of pivot word v in the first target centroid $\overline{C}_i^t$, wherein $\text{wt}(v, \overline{C}_j^s)$ represents the weight of pivot word v in the first source centroid $\overline{C}_j^s$, and wherein $\text{pw}(v)$ is the pivot weight of the pivot word v.

\* \* \* \* \*